Feb. 28, 1950     E. T. KINDT     2,499,146
DOWEL PIN
Filed Jan. 24, 1946
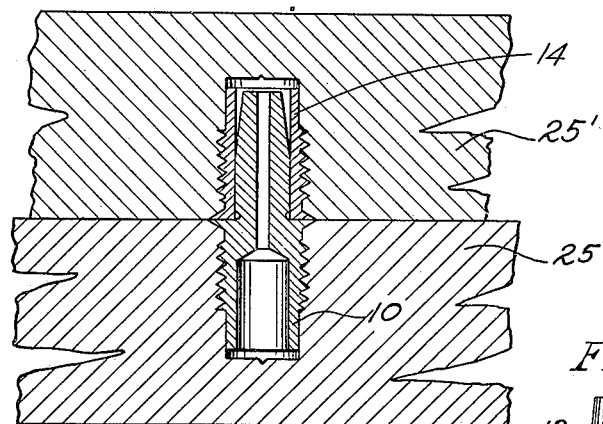
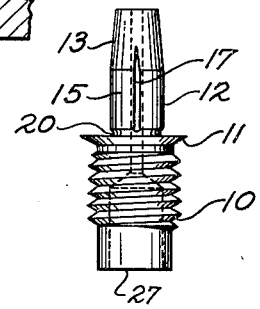
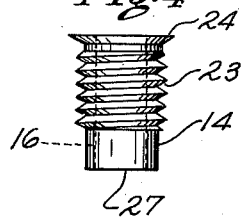
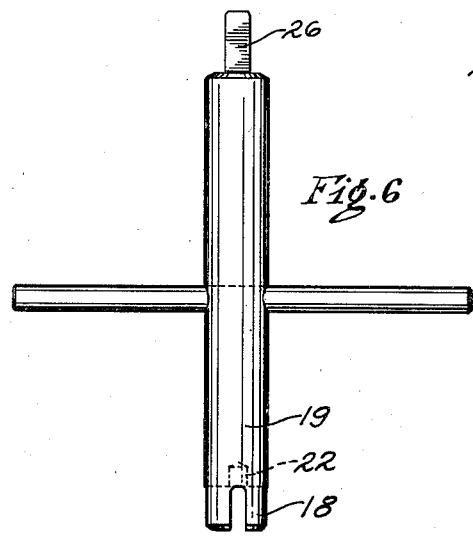
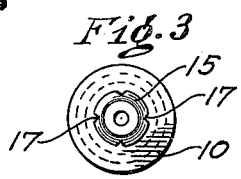
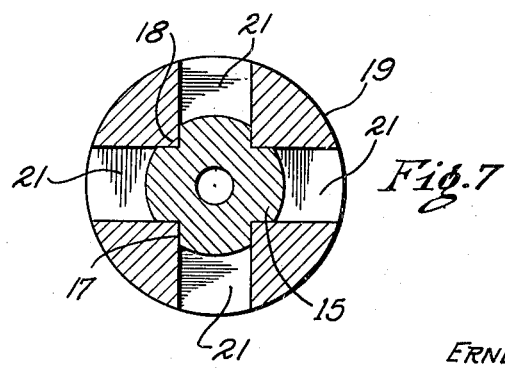
INVENTOR.
ERNEST T. KINDT
BY
*Kirby & Watts*
ATTORNEYS Patented Feb. 28, 1950

2,499,146

UNITED STATES PATENT OFFICE 2,499,146

DOWEL PIN

Ernest T. Kindt, Lakewood, Ohio

Application January 24, 1946, Serial No. 643,145

1 Claim. (Cl. 85—42)

This invention relates to metal dowel pins of the type used in patterns, flasks and similar articles and further pertains to improvements in the dowels and wrenches therefore disclosed in my prior Patents 1,455,793, dated May 22, 1923, and 2,221,141, November 12, 1940.

The primary object of the invention is to provide wrench engaging surfaces in a dowel pin which are of adequate size to withstand the torsional strains imposed upon them when the dowel is screwed in place, and to preclude such mutilation of the wrench engaging faces in the pin as would impair the utility of the pin. More specifically, the objects and advantages of the improved dowel pin reside in the configuration of wrench engaging surfaces which are proportioned relative to the dimensions of the pin to prevent breakage during the seating operation, to prevent such scarring or burring of the body of the pin as would cause the shank to lock or jam within the dowel bushing and to eliminate the possibility of breakage of a wrench of the pin type employed in certain designs of dowels or the reaming of the broached hole or socket in the dowel.

Another object of the invention is to provide a dowel pin and wrench which is efficient of operation, economic of manufacture, sturdy of structure and a design which may be used with equal facility with either pattern or flask dowels.

Other advantages and objects more or less ancillary to the foregoing and the manner in which all the various objects are realized will appear in the following description, which considered in connection with the accompanying drawings sets forth the preferred embodiment of the invention.

Referring to the drawings:

Fig. 1 is a vertical section through the improved dowel pin and bushing illustrated in assembled relation with the work pieces;

Fig. 2 is an elevational view of the improved dowel pin;

Fig. 3 is a top plan view thereof;

Fig. 4 is an elevational view of the dowel bushing;

Fig. 5 is a plan view thereof;

Fig. 6 is an elevational view of the wrench for seating the pin and bushing; and Fig. 7 is a transverse section through the pin-driving end of the wrench and the shank of the dowel pin.

As illustrated in Fig. 2, the dowel pin comprises a threaded body 10 formed with a flange 11 having an axial pin 12 thereon. The upper end 13 of the pin is tapered to facilitate the ready engagement thereof within the socket or bushing 14, the lower end 15 of the pin being of cylindrical form and proportioned for sliding engagement within the opening 16 in the bushing. The outer wall of the pin 12 is formed with one or more vertical grooves 17 configured for engagement with tangs 18 formed in the socket wrench 19. As illustrated in Fig. 2, the portion of the pin adjacent the flange 11 is machined with a circumferential groove 20 of a depth equal to the depth of the grooves 17 in order to provide a clearance for the chips formed by the broach when cutting the grooves 17. The groove 20 further provides a pocket for the reception of such foreign matter as frequently accumulates upon the pin and is forced to the base thereof when the pin is pressed into the bushing. The wrench 19 is preferably constructed with cruciform kerfs 21 in the end portion thereof, the kerfs being of a width which will permit the corners defining the tangs 18 to engage the grooves 17. The body of the wrench adjacent the kerfs 21 is machined with an axial bore 22 to provide a clearance for the tapered free end portion 13 of the dowel pin 12.

The dowel bushing 14 is formed with a threaded shank 23 terminating in a flange 24 similar to the flange 11 adapted for seated engagement in the chamfered throat of the opening in the work piece 25. The bushing is bored and broached throughout its length for engagement with the square end portion 26 of the wrench 19.

In practice, when the dowel pin and bushing are used in a structure formed of wood such as the parts of a pattern or flask 25 and 25', the work is bored to approximately the diameter of the unthreaded end portions 27 of the dowel pin and bushing. The kerfed end of the wrench 19 is then telescopically engaged with the pin 10, the tangs 18 being adjusted for engagement within the grooves 17. The wrench is then manipulated to screw the pin into seated engagement in the work piece. Likewise the shank 26 of the wrench 19 is engaged within the broached hole 16 in the bushing 14 and the bushing member then screwed into seated relation with the work.

In dowels of the character employed in flasks, the cylindrical portion of the pin is preferably much longer than that illustrated herein so that the flask when elevated may be guided until the cope is free from the drag.

Although the grooves 17, as illustrated herein, are formed with a 90° root angle it will be understood that grooves of other configuration may be employed such, for example, as a groove with a square or arcuate base. Likewise the edges defining the side walls of the groove may be rounded off or beveled to eliminate burring of the shank of the pin when exclusive torsional strains are applied to the pin through the wrench 19.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

A dowel pin for mold boxes comprising a threaded shank, an intermediate shoulder, and a pilot pin extending from said shoulder, said pilot pin having a cylindrical portion adjacent said shoulder merging with a terminal tapered portion, the diameter of the cylindrical portion of said pilot pin being less than that of said shank, the cylindrical portion of said pilot pin having formed therein four equally-spaced axially-extending grooves, said grooves being substantially V-shaped in section, each of said grooves having planar walls defining an angle of substantially ninety degrees, the opposed walls of adjacent grooves being parallel for reception of the male tangs of a socket wrench, the surface of said cylindrical portion between the grooves being smooth and uninterrupted to provide a bearing area, the included angle of each groove from the axis of the pin being substantially less than that of each surface between adjacent grooves, said grooves extending into said tapered portion, the walls of said grooves being parallel to the pin axis thereby offering no obstruction to axial entry of the tool tangs therealong.

ERNEST T. KINDT.

REFERENCES CITED

The following references are of record in the file of this patent:

UNITED STATES PATENTS

| Number | Name | Date |
|---|---|---|
| 115,214 | Jones | May 23, 1871 |
| 561,190 | Withers | June 2, 1896 |
| 588,438 | Johnson | Aug. 17, 1897 |
| 654,810 | Schultz | July 31, 1900 |
| 813,093 | Henn | Feb. 20, 1906 |
| 932,563 | Mumford | Aug. 31, 1909 |
| 1,069,383 | Bouillon | Aug. 5, 1913 |
| 1,229,601 | Fox | June 12, 1917 |
| 1,455,793 | Kindt | May 22, 1923 |
| 1,476,501 | Ferry | Dec. 4, 1923 |
| 1,493,079 | Kleiderlein | May 6, 1924 |
| 2,358,611 | Ziebolz | Sept. 19, 1944 |

FOREIGN PATENTS

| Number | Country | Date |
|---|---|---|
| 344,161 | Germany | Nov. 14, 1921 |
| 877,872 | France | Sept. 14, 1942 |